Figure 1:
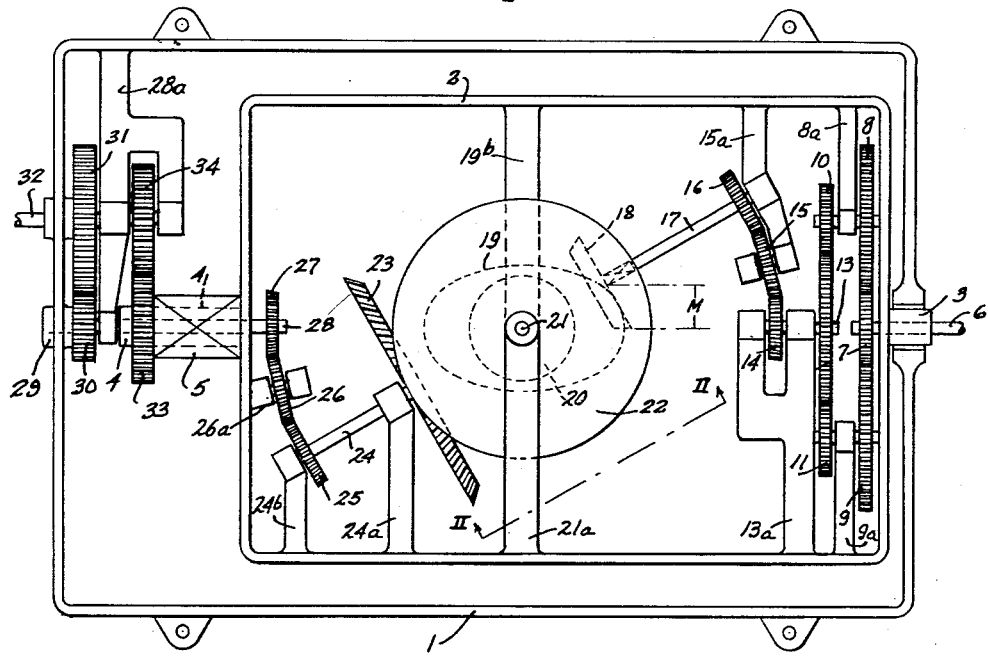

Nov. 28, 1961  W. E. SMITH  3,010,341
TORQUE AMPLIFIER
Filed April 7, 1958

Inventor
William E. Smith

United States Patent Office 3,010,341
Patented Nov. 28, 1961

3,010,341
TORQUE AMPLIFIER
William E. Smith, 9023 S. Laflin St., Chicago, Ill.
Filed Apr. 7, 1958, Ser. No. 726,728
6 Claims. (Cl. 74—705)

This invention relates to improvements in a torque amplifier, and more particularly to such a device for disposition between a prime mover and a load to be driven by the prime mover wherein the arrangement requires added torque on the load, the invention having numerous uses and purposes as will be apparent to one skilled in the art.

In the past, many and various types of torque converters, adapters, and the like have been developed, but these formerly known assemblies failed to satisfactorily approach the provision of all desiderata of a device of that character. For example, in many instances they failed to maximize torque; they did not take advantage of the action of a planetary gear arrangement combined with the customary meshing action of spur and bevel gear trains; they frequently occupied too much space, and in many instances were objectionably costly to produce, install, and operate.

With the foregoing in mind, it is an important object of the instant invention to provide a torque amplifier which provides at the output end an additional torque increment over and above that provided or expected from reduction gear trains.

Another object of the instant invention is the provision of a torque amplifying assembly so arranged as to take advantage not only of the customary meshing action of spur and bevel gears, but also of the action of a train of planetary gears at the same time.

Another feature of the instant invention resides in the provision of a torque amplifying assembly in which reduction and power transmitting gears are all mounted in a common carrier which rotates, carrying the gears bodily therewith, during the action of the gears themselves, the gears rotating about their own axes relatively to the carrier.

It is also an object of this invention to provide a torque amplifying assembly wherein reduction and power transmitting gears are mounted in a unitary carrier that bodily rotates during the action of the gears, the gears being so arranged as to provide not only the results of normal meshing between the gears, but also the results of a planetary gear system adjacent both the input and output ends of the carrier.

Another feature of the instant invention resides in the provision of a torque amplifying assembly wherein a train of gears on the input side is coupled to a train of gears on the output side by a connecting gear disposed on an axis at an inclination to the axes of the other gears.

Also a feature of the instant invention is the provision of a torque amplifying assembly wherein a train of gears on the input side and a train of gears on the output side all have their axes in the same horizontal plane, while a connecting gear establishing driving relationship between the two gear trains is disposed on an axis inclined to that plane.

Still another feature of the instant invention resides in the provision of a torque amplifying assembly embodying a rotary carrier containing a train of gears at the input end and a train of gears at the output end between which driving communication is established by a connecting gear so disposed at the point of tooth contact between the connecting gear, and the adjacent gear of each train is offset from a plane at right angles to the plane including the centers of all the gears.

Figure 2:
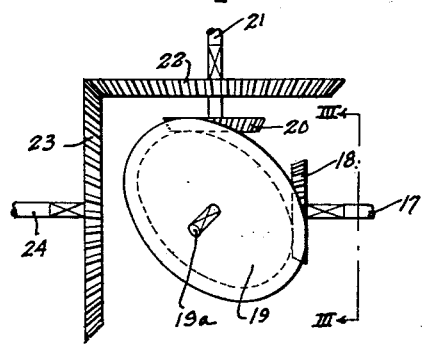
Figure 3:
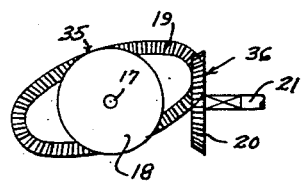

While some of the more salient features, characteristics and advantages of the instant invention have been above pointed out, others will become apparent from the following disclosures, taken in conjunction with the accompanying drawing, in which FIGURE 1 is a fragmentary plan view of a schematic arrangement of an assembly embodying principles of the instant invention, shown with the cover of the housing removed;

FIGURE 2 is a fragmentary view of the arrangement of FIGURE 1, taken substantially as indicated by the line II—II of FIGURE 1, or in other words, a schematic view of the central part of FIGURE 1 rotated 90° from the position seen in FIGURE 1; and FIGURE 3 is a schematic view showing the intermeshing of the connecting gear and the terminal gears on the trains at the input and output ends of the assembly, taken substantially as indicated by the line III—III of FIGURE 2.

As shown on the drawings:

In view of the fact that the relative sizes of the various gears may be varied at will in accord with the speed and torque desired, and the relative locations of the gears may also be varied as may be deemed expedient in view of the use to which the assembly is to be put, it is deemed more desirable herein to illustrate the invention diagrammatically for purposes of clarity. Accordingly, parts of a well known character are not detailed in the drawing, but their location is merely indicated in some instances; for example, it is presumed that the respective shafts are provided with bearings wherever needed, and in the drawings the location of a bearing is merely indicated by a horizontally disposed X, the bearing itself not being shown.

The embodiment of the instant invention selected for illustrative purposes includes a fixed housing 1, illustrated in FIGURE 1 with the upper half or cover portion removed. This housing contains all of the apparatus embodied in the instant invention.

Inside the housing 1 is a carrier 2 mounted for free rotation by way of a hollow journal 3 at one end extending through the wall of the housing, and by way of another hollow journal 4 on the opposite end rotating within a large bearing 5 secured to the housing 1. This carrier 2 may be in the form of an open-sided frame, a cage, a pan, or a completely enclosed casing in the event it is desired to confine a quantity of lubricant therein. The particular shape of the carrier depends upon the exigencies of use and manufacture as will be apparent to one skilled in the art.

This carrier 2 supports or contains the major gearing embodied in the instant invention and by means of which torque amplification is acquired.

For purposes of convenience herein, the gearing supported by the carrier 2 will be considered as an input train, an output train, with the two trains being operatively interengaged by a so-called connecting gear. It will be understood, however, that all of the gearing in the carrier 2 is a complete gear train as such.

At the input end of the housing 1 and also of the carrier 2, a shaft 6 extends through the housing inside the aforesaid hollow journal 3 of the carrier. This shaft is externally connected to any suitable form of prime mover, and on its inner end inside the carrier wall it carries a gear 7. This gear meshes with a pair of oppositely disposed larger gears 8 and 9 which are alike, and the shafts of the gears 8 and 9 on their inner ends carry smaller gears 10 and 11 respectively and may be stabilized by supports 8a and 9a on the journal 3. These gears 10 and 11 are in mesh with a larger gear 12 on a shaft 13, and it will be seen that the shaft 13 is supported on a bifurcated shaft support 13a or the like secured in the journal 3. The gears thus far described are all spur gears, and form a speed reduction train. It will be noted that insofar as operation is concerned, either the gears 8 and 10 or the gears 9 and 11 are not necessary, but the unnecessary pair are utilized as balancing gears so as to maintain the center of gravity of the rotatable carrier 2 and its contents on the axis of the shaft 6, which enters the carrier centrally of an end wall. All of the other gears to be described herein and contained in the carrier 2 are disposed so as to provide a balanced relationship to avoid any adverse results from an unbalanced or eccentric disposition of weight insofar as the carrier is concerned.

Fixed to the inner end of the shaft 13 carrying the gear 12 is a bevel gear 14 in mesh with a similar gear 15 which has a shaft journalled in a support 15a secured to the journal 3 and which in turn meshes with a like gear 16 carried on a shaft 17 also journalled in the support 15a, this train of gears extending generally to one side of the median line through the carrier.

On the inner end of the shaft 17 is a bevel gear 18 in mesh with a larger bevel gear 19 referred to for convenience as the connecting gear and whose shaft is journalled in a support 19b connected to the journal 3 as will be understood by those skilled in the art. The shaft 19a (FIGURE 2) carrying the connecting gear 19 is disposed at an inclination so that the gear 19 is on the slant relatively to the gear 18.

Likewise, the connecting gear 19 is disposed obliquely to the axis of a bevel gear 20 which is like the aforesaid gear 18 and which is carried on the inner end of a shaft 21 journalled in a support 21a connected to the journal 3. This bevel gear 20 is the inside terminal gear of the group referred to for convenience as the output train. The shaft 21 of the gear 20 also carries a larger bevel gear 22 which meshes with a like bevel gear 23 disposed at right angles thereto, and which gear 23 is carried on a shaft 24 journalled in a support 24a and a support 24b on the journal 3 and extending in general alignment with the shaft 17 (FIGURE 1) carrying the gears 16 and 18 of the input train. This shaft 24 also carries at its outer end a bevel gear 25 in mesh with a like bevel gear 26 whose shaft is journalled in a trunnion 26a on the journal 3 and which in turn meshes with a like bevel gear 27 mounted on a shaft 28 extending through the hollow journal 4 of the carrier 2 into a cap bearing 29 on the housing 1 and journalled, in the form shown, in an extension of a bifurcated support 28a on the journal 3. Adjacent its outer end, but inside the housing 1, the shaft 28 carries a spur gear 30 in mesh with a larger spur gear 31 on an output shaft 32 which extends through the wall of the housing 1 for connection to a driven load and which also may be journalled in the support 28a.

As also seen in FIGURE 1, the hollow journal 4 of the carrier 2 has affixed thereon a bevel gear 33 which meshes with a like bevel gear 34 fixed to the output shaft 32.

It will be noted that inside the carrier 2 the bevel gears 25, 26 and 27 are offset from the median line of the carrier in the opposite direction from the bevel gears 14, 15 and 16, so as to preserve the desired balance. It should also be noted that preferably the centers of all the gears, including the inclined connecting gear 19, are disposed in the same plane, even though the axis of the connecting gear 19 is disposed at an angle or inclination to the axes of all the other gears.

Now it is to be especially noted that the point of contact, indicated generally by numeral 35 in FIGURE 3, or point of meshing engagement between the teeth of the bevel gear 18 and the connecting gear 19 is offset from a plane vertical to the plane including the centers of the gears, and similarly the point of contact 36 between the bevel gear 20 and the connecting gear 19 is also offset. This, of course, is by virtue of the inclination of the connecting gear 19.

In operation, the present invention is extremely simple and effective. When the shaft 6 is rotated by any suitable prime mover, the gears above described, omitting gears 33 and 34, effect a speed reduction and increased torque on the output shaft 32 by way of gears 30 and 31. At the same time, the offset contact points 35 and 36 with the connecting gear 19 by the bevel gears 18 and 20 cause the entire carrier 2 to rotate within the housing 1, and carry the gears contained therein bodily around with it, whereby there is provided a planetary gear action at each end of the carrier. Such rotation of the carrier and bodily carrying therewith the gears inside thereof, coupled with the meshing action of the gears themselves rotating relatively to the carrier provides what may be termed an added torque increment on the output shaft 32. The added moment arm providing that torque is indicated at M in FIGURE 1, and is the distance between the point of contact between the gears 18 and 19 and the center line of the carrier 2. This added torque increment caused by the rotation of the carrier 2 is added to the torque on the output shaft 32 through like gears 33 and 34, and is in addition to the torque provided on shaft 32 by the meshing action of the gears themselves. It will thereupon be seen that the instant invention provides a definite mechanical advantage insofar as output torque is concerned. The rotation of the carrier 2 within the housing 1 is accomplished because the meshing of the bevelled gears 18 and 20 with the gear 19 is offset with respect to the plane in which the centers of all the gears are located. Thus a moment is applied as indicated by M in FIGURE 1, acting through point 35 and gear 19 and through point 36, the shaft 21 being mounted in the carrier 2 to transmit the force thus applied to the carrier in the form of torque to rotate the said carrier.

As stated above, there are many and various dispositions of the gears as well as sizes of gears that may be utilized in the instant invention, such changes depending upon the exigencies of purpose and use determined by individual problems. It will be appreciated, however, that the instant invention may be economically manufactured and used, and is extremely long lived.

It will be understood that modifications and variations may be effected without departing from the scope of the novel concepts of the present invention.

I claim as my invention:

1. In a torque amplifying assembly, supporting means, a carrier mounted for free rotation on said supporting means, an input shaft extending into said carrier and rotatable relatively thereto, a power output shaft, a train of gears between said shafts supported by said carrier to rotate bodily therewith while rotating about their axes relatively thereto, said train including a plurality of angularly spaced gears, and a driving connection between said carrier and said output shaft separate from that of said train gears, the centers of all the gears in said train being positioned and maintained in the same plane relative to said carrier, and one of said gears being disposed in angularly offset relationship relatively to a pair of said angularly spaced gears meshing therewith so as to cause rotation of said carrier by the meshing engagement of said pair of gears with said angularly offset gear through the mounting of said pair of gears in said carrier.

2. In a torque amplifying assembly, supporting means, a carrier mounted for free rotation on said supporting means, an input shaft extending into said carrier and rotatable relatively thereto, a power output shaft, a train of gears between said shafts supported by said carrier to rotate bodily therewith while rotating about their axes relatively thereto, and a driving connection between said carrier and said output shaft separate from that of said train of gears, one of the gears of said train being on an axis inclined to that of its driving gear to establish meshing contact therewith in an offset relation thereto and to cause rotation of said carrier.

3. In combination, a drive shaft, a driven shaft, a carrier rotatable relatively to said shafts, means forming a driving connection between said carrier and said driven shaft, and a train of gears supported by said carrier and operatively connecting said shafts, all said gears having their centers in the same plane, and the axis of one gear being at an inclination to the axes of the other gears to provide a point of contact with the gear driving said one gear outside the plane of the gear centers and in a plane at an inclination to the plane of the gear centers to cause rotation of said carrier.

4. In combination in a torque amplifier, a rotatable carrier, a drive shaft extending into said carrier and a driven shaft extending from said carrier both of which are rotatable relatively to said carrier, means forming a driving connection between said carrier and said driven shaft, a planetary train of reduction gears supported by said carrier and driven by said drive shaft, another train of gears in said carrier including at least two in planetary arrangement to actuate the driven shaft, said gears of said gear train having their gear centers disposed in the same plane, and a connecting gear in said carrier having its gear center in said plane and joining said gear trains at contact points outside said plane in a manner to cause rotation of said carrier while said gears are operating.

5. In a torque amplifier, a housing, a carrier mounted for rotation in said housing, an input shaft extending into said housing and into said carrier in relatively rotatable relation to said carrier, on one side of said housing and said carrier, a drive gear on said shaft inside said carrier, a reduction gear train in said carrier operated by said drive gear, a hollow journal extending from the output end of said carrier and disposed in said housing, a first output shaft extending through said journal into said housing, a driven gear on the end of said first output shaft inside said carrier, a gear train in said carrier arranged to drive said driven gear, a connecting gear, said gear trains having inner terminal gears meshing with said connecting gear, said connecting gear having an axis inclined relatively to the axes of the gears in said trains, said inner terminal gears of said trains being mounted in said carrier in axially fixed relation to the carrier to transmit driving force from the input gear through the inner terminal gear of said reduction train to said connecting gear and to said inner terminal gear of said gear train arrange to drive said driven gear and thence through the mounting for said gear train to said carrier to rotate said carrier, a second, power output shaft extending from said housing, gear means connecting the first output shaft with the second output shaft, and gear means connecting said journal with the second output shaft.

6. In a torque amplifier, a housing, a carrier mounted for rotation in said housing, an input shaft extending into said housing and into said carrier in relatively rotatable relation to said carrier, on one side of said housing and said carrier, a drive gear on said shaft inside said carrier, a reduction gear train in said carrier operated by said drive gear, a hollow journal extending from the output end of said carrier and disposed in said housing, a first output shaft extending through said journal into said housing, a driven gear on the end of said first output shaft inside said carrier, a gear train in said carrier arranged to drive said driven gear, a connecting gear, said gear trains having inner terminal gears meshing with said connecting gear, said connecting gear having an axis inclined relatively to the axes of the gears in said trains, said inner terminal gears of said trains being mounted in axially fixed relation to the carrier to transmit driving force from the input gear through the inner terminal gear of said reduction train to said connecting gear and to said inner terminal gear of said gear train arranged to drive said driven gear and thence through the mounting of said gear trains in axially fixed relation to said carrier to rotate said carrier, a second, power output shaft extending from said housing, gear means connecting the first output shaft with the second output shaft, and gear means connecting said journal with the second output shaft, the gears in said carrier all having their centers in the same plane, and the points of contact between said connecting gear and said terminal gears being each offset from a plane normal to the locus plane for said centers.

References Cited in the file of this patent

UNITED STATES PATENTS

| 1,221,626 | Tadey | Apr. 3, 1917 |
| 1,596,025 | Ross | Aug. 17, 1926 |
| 1,777,860 | Sandherr | Oct. 7, 1930 |

FOREIGN PATENTS

| 359,922 | Italy | June 8, 1938 |
| 294,446 | Switzerland | Jan. 16, 1954 |